(12) United States Patent
Shiratori et al.

(10) Patent No.: US 12,361,229 B2
(45) Date of Patent: Jul. 15, 2025

(54) DETECTION AND CORRECTION OF MIS-TRANSLATION

(71) Applicant: INTERNATIONAL BUSINESS MACHINES CORPORATION, Armonk, NY (US)

(72) Inventors: Takaaki Shiratori, Machida (JP); Takehiko Ishii, Yokohama (JP); Tomoka Mochizuki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 17/657,402

(22) Filed: Mar. 31, 2022

(65) Prior Publication Data

US 2023/0316007 A1    Oct. 5, 2023

(51) Int. Cl.
   *G06F 40/58*   (2020.01)
   *G06F 40/51*   (2020.01)

(52) U.S. Cl.
   CPC ............. *G06F 40/58* (2020.01); *G06F 40/51* (2020.01)

(58) Field of Classification Search
   None
   See application file for complete search history.

(56) References Cited

U.S. PATENT DOCUMENTS

| | | | |
|---|---|---|---|
| 8,606,559 B2 | 12/2013 | Jin | |
| 11,797,530 B1* | 10/2023 | Bouyarmane | G06N 3/045 |
| 2010/0138210 A1 | 6/2010 | Seo | |
| 2014/0200878 A1* | 7/2014 | Mylonakis | G06F 40/51 704/4 |
| 2015/0347397 A1* | 12/2015 | Venkatapathy | G06F 40/44 704/2 |
| 2016/0267077 A1* | 9/2016 | Bahgat | G06F 40/51 |
| 2017/0169015 A1* | 6/2017 | Huang | G06F 40/51 |
| 2017/0177712 A1* | 6/2017 | Kopru | G06F 16/3337 |
| 2023/0025739 A1* | 1/2023 | Zhou | G06F 40/211 |

FOREIGN PATENT DOCUMENTS

JP    1995028819 A    1/1995

OTHER PUBLICATIONS

"Machine Translation in Translation: A Cheat Sheet", Lionbridge, Aug. 10, 2018, 5 pages, <https://www.lionbridge.com/blog/translation-localization/machine-translation-in-translation/>.
"Natural language understanding (NLU)", Techtarget Network, Jun. 2021, Printed Feb. 19, 2022, 5 pages, <https://searchenterpriseai.techtarget.com/definition/natural-language-understanding-NLU>.

(Continued)

*Primary Examiner* — Nicole A K Schmieder
(74) *Attorney, Agent, or Firm* — Gavin Giraud

(57) ABSTRACT

In a method for improving machine translation results, a processor receives a target document in a first language. A processor may also translate the target document into a first translated document in a second language using a first neural machine translation (NMT) model, determine a target attribute value from the target document and a first translated attribute value for the first translated document using a natural language understanding (NLU) model, and compare the target attribute value to the first translated attribute value to determine a first comparison score for the first NMT model.

17 Claims, 7 Drawing Sheets

(56) References Cited

OTHER PUBLICATIONS

"Neural Machine Translation Definition", DeepAI, Printed Feb. 9, 2022, 4 pages, <https://deepai.org/machine-earning-glossary-and-terms/neural-machine-translation>.

Comparin et al., "Error detection and error correction for improving quality in machine translation and human post-editing", Semantic Scholar, 2017, 13 pages, <http://www.clul.ulisboa.pt/files/849/Comparin_Mendes_2017_original.pdf>.

Filiz, Fahrettin, "Natural Language Understanding", Medium.Com, Jan. 28, 2018, 5 pages, <https://medium.com/@fahrettinf/natural-language-understanding-f50cc3229991>.

Kavlakoglu, Eda, "NLP vs. NLU vs. NLG: the differences between three natural language processing concepts", IBM Watson Blog, Nov. 12, 2020, 6 pages, <https://www.ibm.com/blogs/watson/2020/11/nlp-vs-nlu-vs-nlg-the-differences-between-three-natural-language-processing-concepts/>.

Munz et al., "Visual-Interactive Neural Machine Translation", Graphics Interface, Apr. 10, 2021, 10 pages, <https://ppenreview.net/forum?id=DQHaCvN9xd>.

Selig, Jay, "Natural Language Understanding: What It Is and How It Differs from NLP", Expert.ai blog, Apr. 11, 2020, 4 pages, <https://www.expert.ai/blog/natural-language-understanding-different-nlp>.

Song et al., "Neural Machine Translation with Error Correction", Proceedings of the Twenty-Ninth International Joint Conference on Artificial Intelligence (IJCAI-20), Jul. 11-17, 2020, Yokohama Japan, 7 pages, <https://www.ijcai.org/proceedings/2020/538>.

Sun et al., "Automatic testing and improvement of machine translation", Proceedings of the 2020 IEEE/ACM 42nd International Conference on Software Engineering (ICSE), Jun. 24, 2020, 12 pages, <https://dl.acm.org/doi/10.1145/3377811.3380420>.

Yamauchi et al., "Automatic Corpora Generation for Machine Translation", Panasonic Technical Journal, vol. 63 No. 1, May 2017, 6 pages, <https://www.panasonic.com/jp/corporate/technology-design/ptj/pdf/v6301/p0105.pdf>.

* cited by examiner

DETECTION AND CORRECTION OF MIS-TRANSLATION

BACKGROUND

The present invention relates generally to the field of machine translation from one language to another language, and more particularly to detecting obvious mistranslations from a computer utilizing natural language understanding (NLU).

The accuracy of machine translations has improved recently due to incorporation of neural machine translation (NMT) technology. Compared with past rule-based or statistics-based machine translations, NMT technology creates more natural and recognizable translations. NMT departs from phrase-based statistical approaches that use separately engineered subcomponents. Its main departure is the use of vector representations ("embeddings", "continuous space representations") for words and internal states. The structure of the models is simpler than phrase-based models. There is no separate language model, translation model, and reordering model, but just a single sequence model that predicts one word at a time.

The term natural-language understanding (NLU) can be applied to a diverse set of computer applications, ranging from short commands issued to robots to complex endeavors such as the full comprehension of newspaper articles or poetry passages. NLU is branch of natural language processing (NLP), which helps computers understand and interpret human language by breaking down the elemental pieces of speech. NLU goes beyond recognition to determine a user's intent. Speech recognition is powered by statistical machine learning methods which add numeric structure to large datasets. In NLU, machine learning models improve over time as they learn to recognize syntax, context, language patterns, unique definitions, sentiment, and intent.

SUMMARY

Aspects of an embodiment of the present invention disclose a method, computer program product, and computing system for improving machine translation results. In one stage, a processor may receive a target document in a first language. A processor may also translate the target document into a first translated document in a second language using a first neural machine translation (NMT) model, determine a target attribute value from the target document and a first translated attribute value for the first translated document using a natural language understanding (NLU) model, and compare the target attribute value to the first translated attribute value to determine a first comparison score for the first NMT model.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "system." Furthermore, aspects of the present invention may take the form of a computer program product embodied in one or more computer-readable medium(s) having computer-readable program code/instructions embodied thereon.

Instances of obvious mistranslations can readily be found even in the newest and most accurate neural machine translations (NMT) today. Translators can correct mistranslation using correction tools based on dictionaries and rules or human verification efforts, but a problem arises because the additional labor-centric efforts are costly. Businesses that translate a large number of documents wish to obtain reliable translation (i.e., translation that does not contain obvious mistranslation) without human intervention. Any company that provides documents through machine translation with no involvement of human processing is taking a risk: a document using NMT may contain an obvious mistranslation that may result in lowering perceived reliability and diminished reputation of the product or company.

Embodiments disclosed herein, therefore, detect obvious mistranslations by utilizing natural language understanding (NLU). The NLU is used to tease out attributes from a first source of sentences, and corresponding translated sentences, respectively. The attributes of the first source of sentences are compared to the attributes of the translated sentences to detect any obvious mistranslations (attribute difference). Upon detection of a mistranslation, a translation model is changed, and attributes are compared again to obtain a translation with closer attributes. If such translation is found, it is adopted as the final translation. If a difference of attributes remains, this comparison is repeated until existing translation models run out.

When translation with closer attributes is not found, a bilingual corpus collected only from sentences with closer attributes is generated automatically to create a new translation model, whereby correcting mistranslation without human processing.

Figure 1:
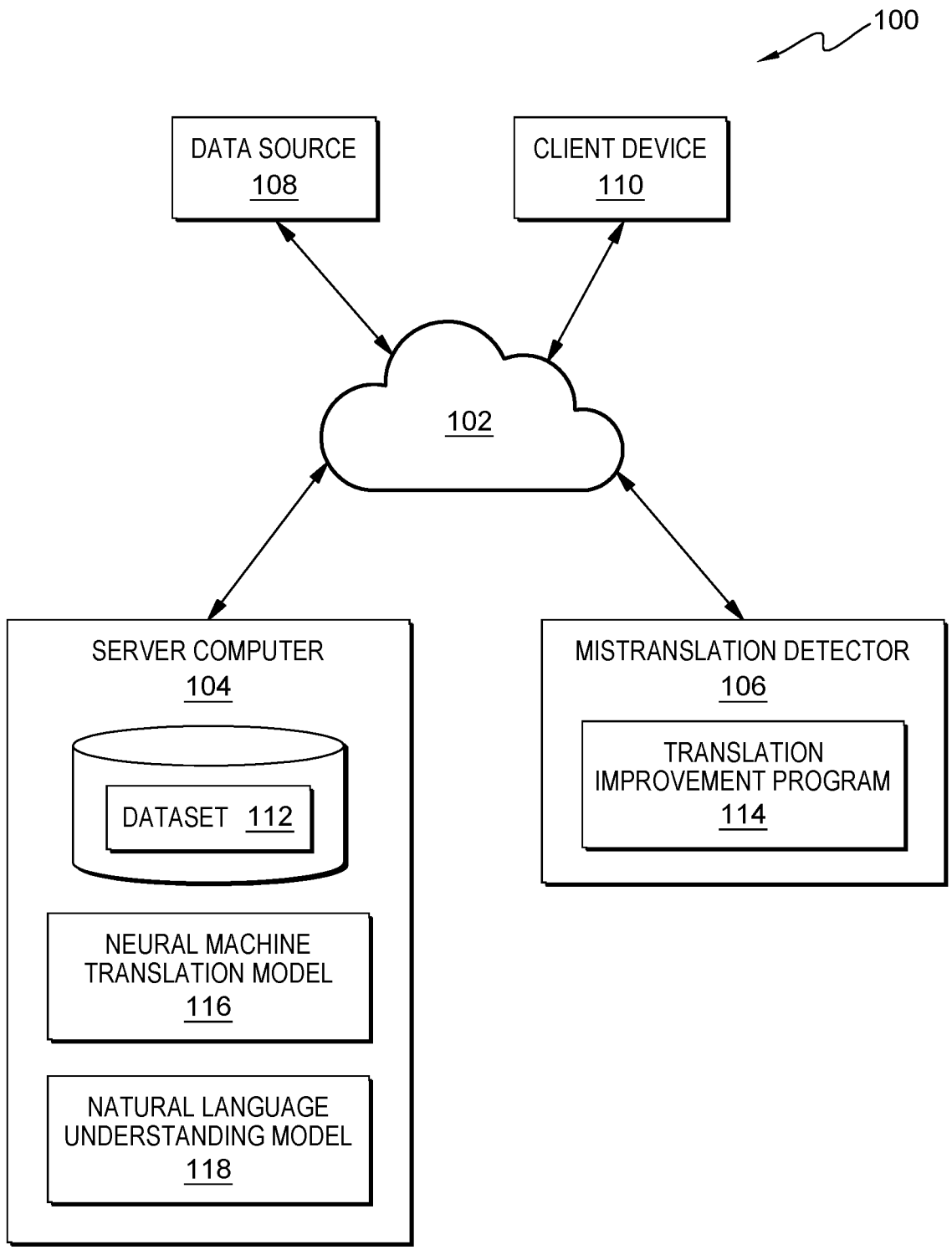
FIG. 1 depicts a diagram of a machine translation system in accordance with one embodiment of the present invention.

FIG. 1 depicts a diagram of machine translation system 100 in accordance with one embodiment of the present invention. FIG. 1 provides only an illustration of one embodiment and does not imply any limitations with regard to the environments in which different embodiments may be implemented. Many modifications to the depicted environment may be made by those skilled in the art without departing from the scope of the invention as recited by the claims.

The machine translation system 100 includes a server computer 104, a mistranslation detector 106, a data source 108, and a client device 110 connected over a network 102. The network 102 can be, for example, a telecommunications network, a local area network (LAN), a wide area network (WAN), such as the Internet, or a combination of the three, and can include wired, wireless, or fiber optic connections. The network 102 can include one or more wired and/or wireless networks that are capable of receiving and transmitting data, voice, and/or video signals, including multimedia signals that include voice, data, and video information. In general, the network 102 can be any combination of connections and protocols that will support communications between the server computer 104, the mistranslation detector 106, the data source 108, the client device 110, and other computing devices (not shown) within the machine translation system 100. In various embodiments, the network 102 operates locally via wired, wireless, or optical connections and can be any combination of connections and protocols (e.g., personal area network (PAN), near field communication (NFC), laser, infrared, ultrasonic, etc.).

The server computer 104 can be a standalone computing device, a management server, a web server, a mobile computing device, or any other electronic device or computing system capable of receiving, sending, and processing data. In other embodiments, the server computer 104 can represent a server computing system utilizing multiple computers as a server system, such as in a cloud computing environment. In another embodiment, the server computer 104 can be a laptop computer, a tablet computer, a netbook computer, a personal computer (PC), a desktop computer, a personal digital assistant (PDA), a smart phone, or any programmable electronic device capable of communicating with other computing devices (not shown) within the machine translation system 100 via the network 102. In another embodiment, the server computer 104 represents a computing system utilizing connected computers and components (e.g., database server computers, application server computers, etc.) that act as a single pool of seamless resources when accessed within the machine translation system 100. In the depicted embodiment, the server computer 104 includes a dataset 112 that may include documents and corresponding translations collected from the data source 108. In other embodiments, the server computer 104 may contain other applications, databases, programs, etc. which have not been depicted in the machine translation system 100. The server computer 104 may include internal and external hardware components, as depicted and described in further detail with respect to FIG. 7.

The mistranslation detector 106 includes a translation improvement program 114 that identifies mistranslations using a comparison of results from a neural machine translation (NMT) model 116, or models, and a natural language understanding (NLU) model 118, or models that may be stored on the server computer 104. The mistranslation detector 106 may accept requests from the client device 110, and deliver results from the translation improvement program 114 to the client device 110 as well. The dataset 112 is a repository for data used by the translation improvement program 114, the NMT model 116, and the NLU model 118. In the depicted embodiment, the dataset 112 resides on the server computer 104. In another embodiment, the dataset 112 may reside elsewhere within the machine translation system 100, provided the translation improvement program 114, the NMT model 116, and the NLU model 118 have access to the dataset 112. The dataset 112 can be implemented with any type of storage device capable of storing data and configuration files that can be accessed and utilized by the translation improvement program 114, the NMT model 116, and the NLU model 118, such as a database server, a hard disk drive, or a flash memory. In an embodiment, the dataset 112 stores a data stream used by the translation improvement program 114, the NMT model 116, and the NLU model 118, such as real-time stock prices, stock comparisons, company financial information, or other investment factors. The dataset 112 may more generally contain one or more sets of one or more instances of unclassified data.

In the depicted embodiment, the translation improvement program 114 is a standalone software program. In another embodiment, the functionality of the translation improvement program 114, or any combination programs thereof, may be integrated into a single software program. In some embodiments, translation improvement program 114 may be located on separate computing devices (not depicted) but can still communicate over the network 102. In various embodiments, client versions of the translation improvement program 114 may reside on any other computing device (not depicted) within the machine translation system 100. The translation improvement program 114 is depicted and described in further detail with respect to FIG. 2.

Figure 2:
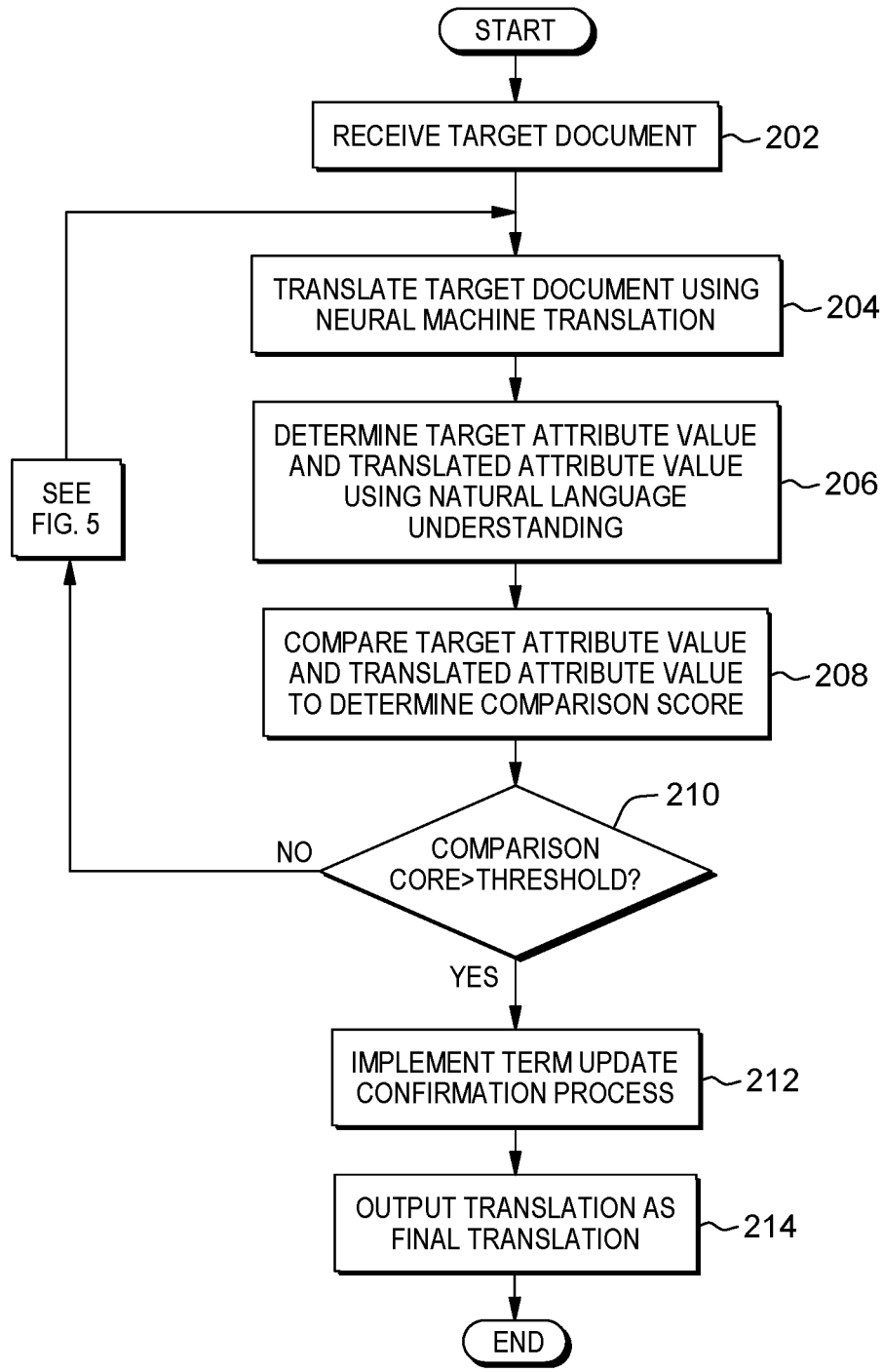
FIG. 2 depicts a flowchart of the steps of a translation improvement program executing within the system of FIG. 1, in accordance with one embodiment of the present invention.

FIG. 2 depicts operational procedures of the translation improvement program 114 of FIG. 1, in accordance with an embodiment of the present invention. The translation improvement program 114 receives a target document (block 202). The target document may be received as part of a batch process where many documents are stored in the dataset for translation and improved translation. Furthermore, the target document may be a division of a document. For example, a larger document may be broken up into chapters, sections, paragraphs, or other smaller sentence blocks for automatic translation, with each chapter, section, paragraph, or sentence block representing a target document.

The translation improvement program 114 may then translate the target document using the NMT model 116 (block 204). The NMT model 116 works by assessing the target document as a single input; viewing the target document as a whole, rather than separating it into sub-components. The NMT model 116 can thus identify connections between words and the concepts represented by the words are strengthened or weakened depending on which words occur together. As a result, the NMT model 116 makes translation choices based on the strength of contextual information to produce a translated document.

The translation improvement program 114 may then determine a target attribute value from the target document and a translated attribute value for the translated document using the NLU model 118 (block 206). The "attribute values" which the NLU model 118 determines from the sentence blocks (i.e., target document and translated document) may include several forms of values. For example, the NLU model 118 may return a plurality of pairs, each pair including an "{attribute type, numerical value}" combination for the entire sentence block. The attribute types may be selected from classes such as: 'entity,' 'intent,' 'category,' and 'keyword.' The numerical value may range from 0 to 100, or from 0 to 1.0 to indicate a level of confidence that the NLU model 118 determines for that sentence block. For instance, the NLU model 118 may determine that a sentence block indicates a strong correlation to the entity "Tokyo." For this sentence block, the NLU model 118 may produce an attribute value that includes a pairing of "Tokyo" with a high value score (e.g., {Tokyo, 95}) and may also produce an attribute value that includes a pairing of "Japan" with a high value score (e.g., {Japan, 85}).

In certain embodiments, the NLU model 118 may return the attribute value as a single "{attribute type, numerical value}" combination for the entire sentence block. This type of attribute may be characterized as a sentiment, with the numerical value representing the confidence that the single sentiment conveys the meaning of the sentence block.

Once the attribute values for the target document and the translated document are determined, the translation improvement program 114 may compare the target attribute value to the translated attribute value to determine a comparison score for the NMT model 116 (block 208). The translation improvement program 114 may determine the comparison score in a number of ways including a ranking of the attribute values within the target document and the translated document, matching attribute values, or other comparison techniques. Further examples are described below in the description of FIG. 5.

The translation improvement program 114 may then determine whether the comparison score is greater than a threshold (block 210). If the comparison score is not greater than the threshold (block 210, No), the translation improvement program 114 may try a different NMT model 116, repeating the process to determine a comparison score and determine whether the new comparison score is greater than the threshold. Additional considerations and process steps for situations in which the comparison score is not greater than the threshold are described in the description of FIG. 4.

If the comparison score is greater than the threshold (block 210, Yes), the translation improvement program 114 may implement a term update confirmation process (block 212). The term update confirmation process is optional, but may improve the translation for specific terms that the translation improvement program 114 recognizes as a potential mistranslation. For the translation improvement program 114 to implement a term update, an update information database must be prepared previously. For example, the translation improvement program 114 may analyze information by crawling the internet, specific websites, databases, etc. with a corresponding language-specific established translation. This analysis determines time-based translations such that when a parallel translation term goes out of style in favor of an updated term, the parallel translation term and the updated term are stored as a set in the update information database. A switching threshold is set to apply contents of the update information database according to respective attribute values in advance. That is, when a value beyond a designated value is detected, automatic substitution is executed.

Once the parallel translation term and the updated term are stored, the translation improvement program 114 can replace the parallel translation term with the updated term when one of the attribute values exceeds the switching threshold. The translation improvement program 114 may replace the parallel translation term by associating the target attribute value with a subject, and substituting a detected term in the first translated document with a substitute term related to the subject. For example, the target document may contain the English phrase: "Merge the changes made to your GitHub branch into the master." The translated document may contain the translation as "GitHub ブランチに加えられた変更をマスターにマージします。". The term "マスター", however, may be stored in the update information database with an updated term that changes "マスター" to "メイン" when the switching threshold for the subject: "GitHub" is above a certain value. Since the English phrase contains "GitHub," the translation improvement program 114 assigns the attribute value for the subject GitHub as higher than the switching threshold, and the translation document is changed to "GitHub ブランチに加えられた変更をメインにマージします。"

When the translated document achieves a comparison score above the threshold, and the optional implementation of term updating is complete, the translation improvement program outputs the translated document as a final translation for the target document (block 214). Outputting the translated document may include displaying the translated document on the client device 110, adding the translated document to the dataset 112, or other storage or display procedures that are known in the art.

Figure 3:
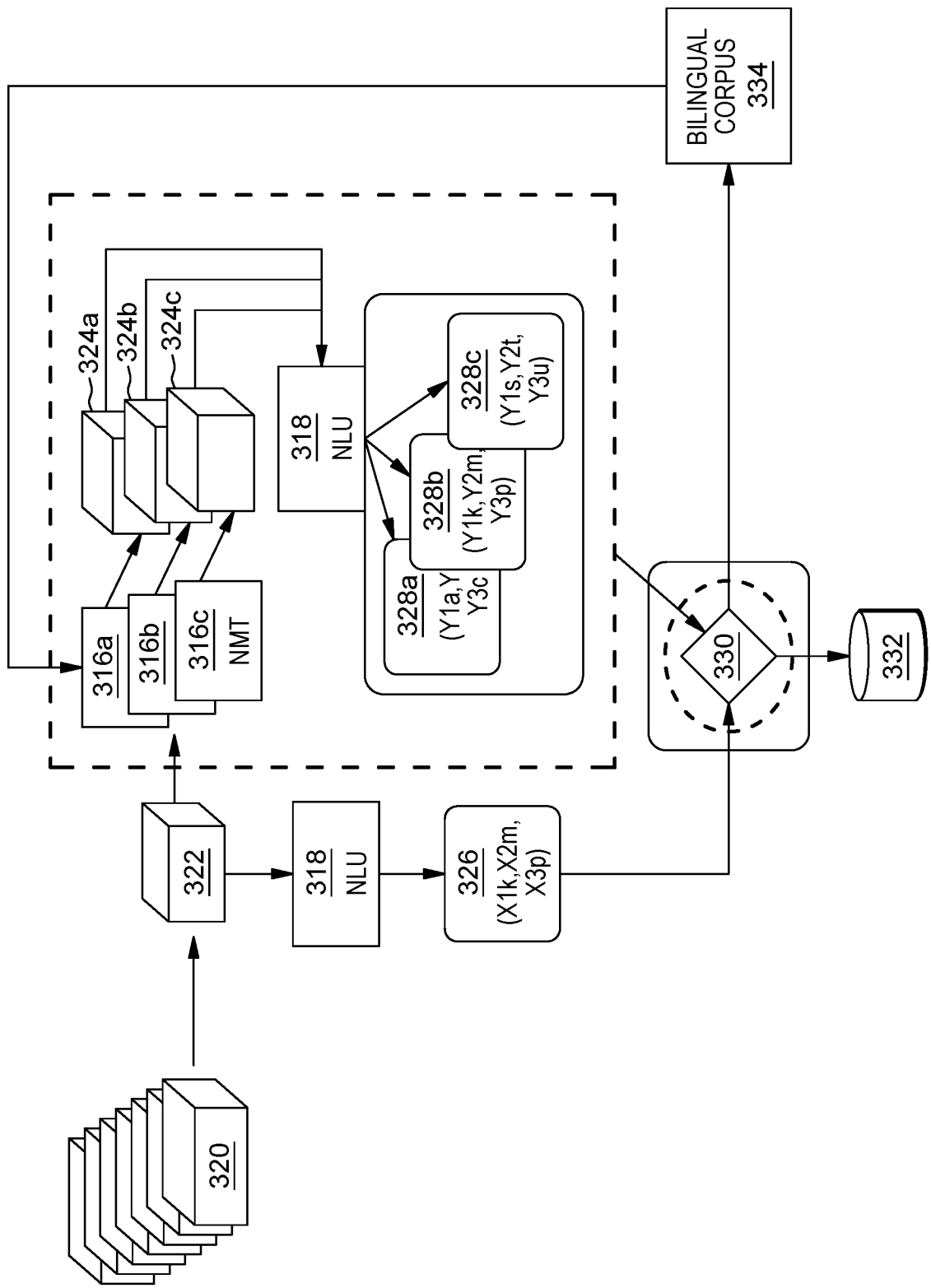
FIG. 3 depicts a schematic diagram of a system operating to improve machine translation results, in accordance with one embodiment of the present invention.

FIG. 3 depicts a schematic diagram representing a machine translation process operating to improve machine translation results, in accordance with one embodiment of the present invention. The machine translation process takes a collection of documents for translation 320 and selects one target document 322 for translation. The target document 322 is translated using neural machine translation (NMT) models 316a, b, c that translate the target document 322 into a translation language. FIG. 3 shows three NMT models 316a, b, c, but embodiments of the present invention may include any number of NMT models 316a, b, c to produce translated documents 324a, b, c. Each NMT model 316a, b, c may produce a translated document 324a, b, c. The translated documents 324a, b, c may be produced simultaneously or at separate times depending on when the NMT models 316a, b, c are available for translation. The translated documents 324a, b, c, and the target document 322 are put through a natural language understanding (NLU) model 318 to determine a target attribute value 326 and translated attribute values 328a, b, c. In certain embodiments, a single NLU model 318 may be used to determine the target attribute value 326 and the translated attribute values 328a, b, c.

Figure 4:
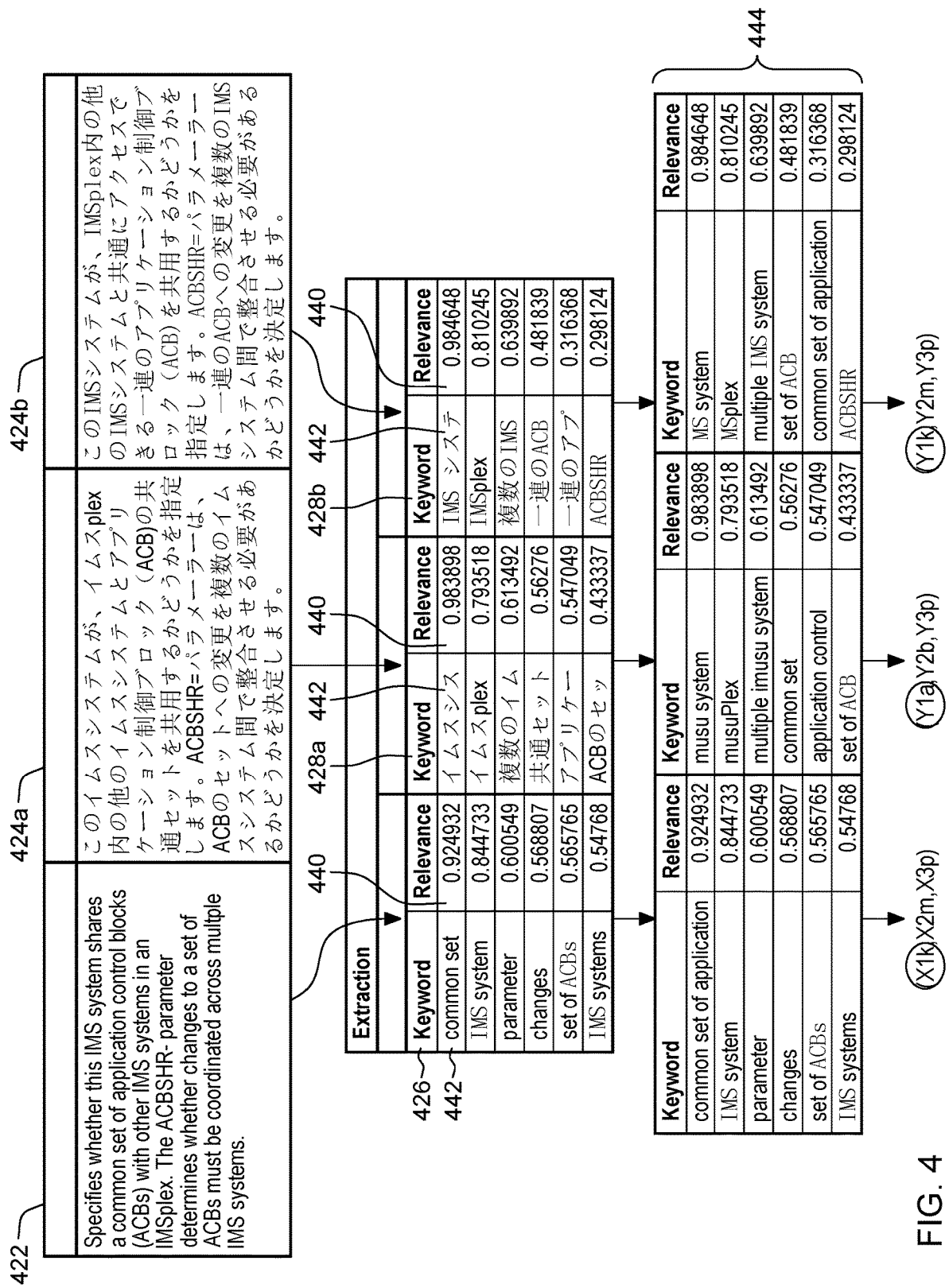
FIG. 4 depicts an attribute comparison process, in accordance with one embodiment of the present invention.

At a decision block 330 the target attribute value 326 and translated attribute values 328a, b, c are compared to determine matches or mismatches. For example, the matches or mismatches may be determined by picking up one of the categories of attribute values (i.e., 'entity', 'intent', 'category', or 'keyword') that has more than a certain number of determined values. That is, the target attribute value 326 and the translated attribute values 328a, b, c may include ten and twelve pairs (i.e., {attribute value, numerical value}), respectively, of values for an "entity." These entity values for the target attribute value 326 and the translated attribute values 328a, b, c may be ranked, with the top X (e.g., top six results, as illustrated in FIG. 4) target attribute values 326 compared to the top X translated attribute values 328a, b, c. If X-k entities are the same between the target attribute values 326 and the translated attribute values 328a, b, c, then the translated document 324a, b, c is a match, and if X-k entities are not the same between the target attribute values 326 and the translated attribute values 328a, b, c, then the translated document 324a, b, c is not a match. This process is illustrated in FIG. 4.

FIG. 4 depicts an attribute comparison process, in accordance with one embodiment of the present invention. A target document 422, a first translated document 424a, and a second translated document 424b are put through a NLU process to determine target attribute values 426, first translated attribute values 428a, and second translated attribute values 428b. The target attribute values 426, first translated attribute values 428a, and second translated attribute values 428b are ranked according to a relevance 440. Keywords 442 of the first translated attribute values 428a and second translated attribute values 428b may then be translated back to the target language to give translated ranked attributes 444. A comparison (e.g., by the translation improvement program 114 or the decision block 330) of keywords 444 that appear in the top six results indicates whether there is a match between the first translated document 424a or the second translated document 424b. Specifically, since the first translated document 424a has only one partial match (i.e., "common set of application" partially matched to "common set"), and the second translated document 424b has three matches (i.e., "common set of application," "IMS system," and "set of ACB") then the second translated document 424b is matched and outputted as the final translation, while the first translated document 424a is not.

The translated ranked attributes 444 may be further evaluated to generate a normalized vector to determine whether the target document 422 and the translated documents 424 are regarded as matched. The normalized vectors may be compared to determine a distance difference (e.g., using a degree of cosine similarity), or a similarity calculated using known vector comparison techniques. Values of extracted attribute such as entity, intent, and keyword corresponding to a national language are normalized to those of a standard language using a term dictionary. Values of the attribute keywords 442 obtained from a sentence are classified into terms and the appearance of each term is measured and vectorized (process known as bags-of-words or BoW). In attributes such as category and emotion, standard attribute names determined by an implementor are used. In this case, a normalization process to turn attributes into those of a standard language is not performed. After this process, all values of attributes extracted from a sentence are arranged to provide one sentence and vectorized so that attributes are expressed by normalized vectors having common elements. To vectorize a sentence, vectorization by bag-of-words process is presented in the example oft to have his material.

Turning back to FIG. 3, the decision block 330 may also calculate a comparison individually for each attribute. If specific target attribute values 326 match specific translated attribute values 328a, b, c, within a given percentage, then the attributes "match." In this instance, the target document 322 matches the translated document 324a, b, c if a percentage of the total attributes are a match (e.g., 70% of the target attribute values 326 match the translated attribute values 328a, b, c, and the threshold for matching is 80%, then the target document 322 does not match the translated document 324a, b, c).

If the decision block 330 determines a match, the translated document 324a, b, c is forwarded to translation results 332.

If the decision block 330 determines that the translated document 324a, b, c is not a match, the translated document 324a, b, c may be incorporated into a bilingual corpus 334. The bilingual corpus 334 may be updated, and the updating may be performed by the translation improvement program 114 as outlined in FIG. 5.

Figure 5:
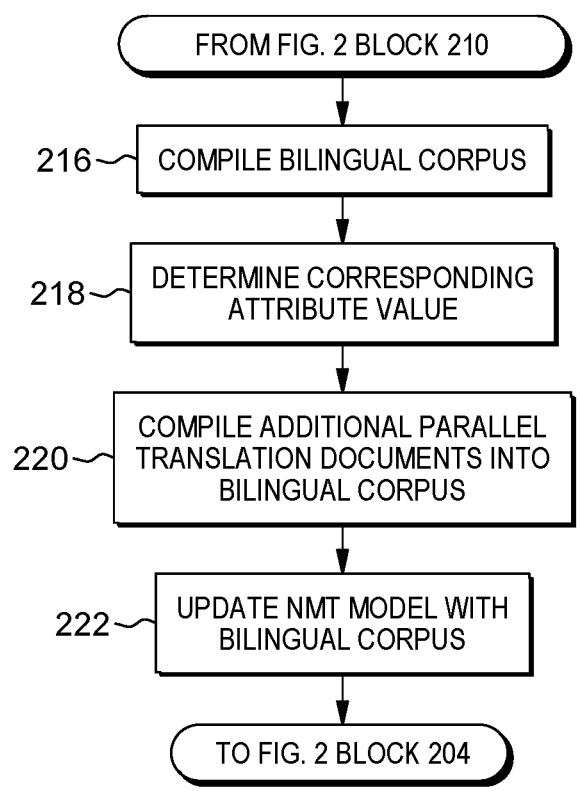
FIG. 5 depicts a flowchart of the steps of the translation improvement program 114 executing within the system of FIG. 1, in accordance with one embodiment of the present invention.

FIG. 5 depicts a flowchart of the steps of the translation improvement program 114 executing within the system of FIG. 1, in accordance with one embodiment of the present invention. Continuing as an optional branch from FIG. 2, after the comparison score is determined to not be greater than the threshold (block 210, No), the translation improvement program 114 may compile a bilingual corpus (e.g., the bilingual corpus 334 of FIG. 3) (block 216).

Figure 6:
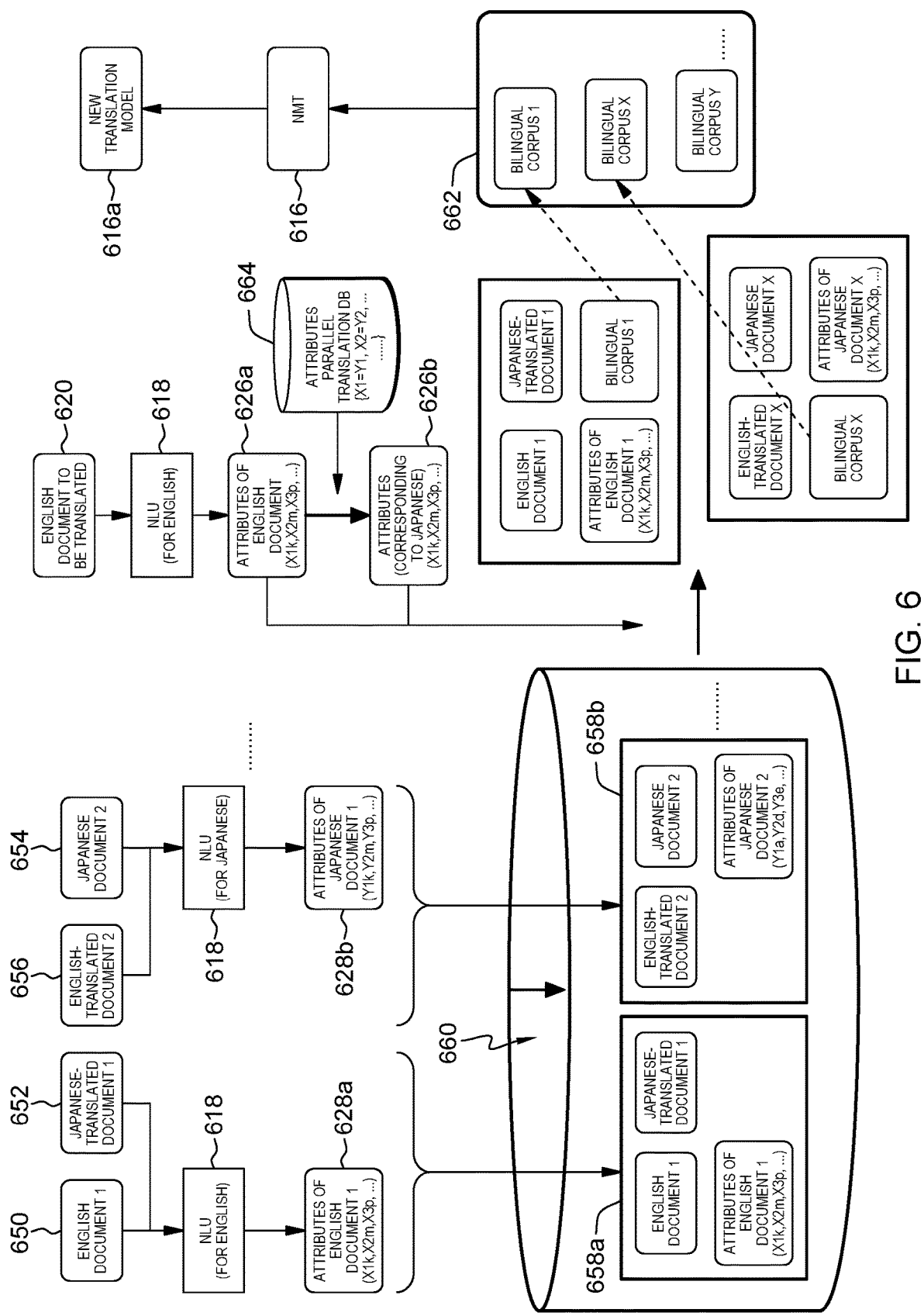
FIG. 6 depicts a bilingual corpus compilation process, in accordance with one embodiment of the present invention.

FIG. 6 depicts a bilingual corpus compilation process, in accordance with one embodiment of the present invention. The process involves English documents 650, Japanese translated documents 652 (corresponding to the English documents 650), Japanese documents 654, and English translated documents 656 (corresponding to the Japanese documents 654). While the illustrated embodiment includes English and Japanese, the bilingual corpus may be compiled and utilized between any two languages. The Japanese translated documents 652 and the English translated documents 656 are confirmed, corrected translations from trusted sources. The English document 650 and the Japanese documents 654 are evaluated with an NLU model 618 to derive first language attribute values 628a and second language attribute values 628b.

The English documents 650 and Japanese documents 654 may be combined with the Japanese translated documents 652 and English translated documents 656, and first language attribute values 628a and second language attribute values 628b, respectively, to form database entries 658a, b for a bilingual database 660. The database entries 658a, b may include combinations of any size. For example, a word, a sentence, a paragraph, or larger sentence block may be translated and evaluated by the NLU model 618 to produce one of the database entries 658a, b. The database entries 658a, b may be detected and produced by crawling the internet or other text location with established translations. From the database entries 658a, b, the translation improvement program 114 may produce a bilingual corpus 662. The bilingual corpus 662 is a parallel text translation corpus having structured sets of translated texts between two languages.

To compile the bilingual corpus 662, the translation improvement program 114 uses an English document to be translated 620 to determine target attribute values 626a, b derived from the NLU model 618 (block 218). While an English document to be translated 620 is used in this example, the document to be translated may include any language and is not limited to the examples shown here in this example. The target attribute values 626a may be converted into corresponding target attribute values 626b in the translation language using an attribute parallel translation database 664. The attribute parallel translation database 664 contains pairs of attributes that are analogous between the first language (i.e., English in the illustrated embodiment) and the second language (i.e., Japanese).

The translation improvement program 114 may then select entries 658 from the bilingual database 660 that contain the target attribute values 626a or the corresponding target attribute values 626b for inclusion into the bilingual corpus 662 (block 220). The limiting of the entries 658 selected from the bilingual database 660 enables the bilingual corpus 662 to more pointedly and more specifically tailor an NMT model 616 to the translation needs associated with the document to be translated 620. That is, when the NMT model 616 is trained using the specifically-selected bilingual corpus 662, a new NMT translation model 616a is produced, with a better accuracy for translating documents containing the target attribute values 626a, b (block 222).

Projecting this step into the bilingual corpus step 334 of FIG. 3, a new NMT model 316d is produced, and the process of translating the target document 322 into a translated document 324d may be repeated.

Figure 7:
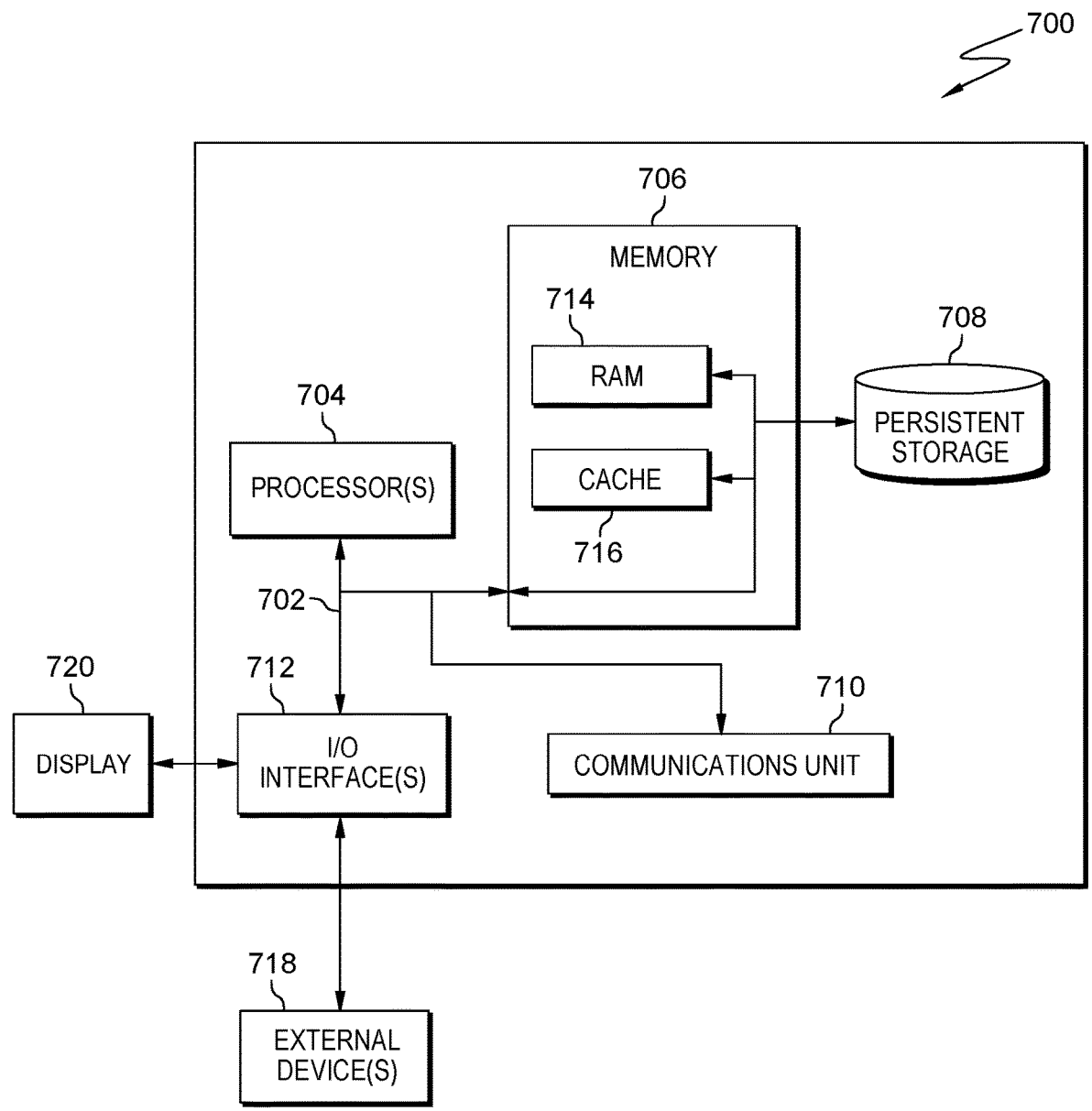
FIG. 7 depicts a block diagram of components of the server and the computing device in accordance with one embodiment of the present invention.

FIG. 7 depicts a block diagram of components of a computing device 700 in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be incorporated.

The computing device 700 represents any device described in the embodiments above, and each the computing device 700 may include communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

The translation improvement program 114, for example, may be stored in persistent storage 708 of the computing device 700 for execution by one or more of the respective computer processors 704 of the computing device 700 via one or more memories of memory 706 of the computing device 700. The translation improvement program 114, NMT models 116, NLU models 118, and other programs are stored for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. The translation improvement program 114 may be downloaded to persistent storage 708 of the computing device 700 through communications unit 710 of the computing device 700.

I/O interface(s) 712 allows for input and output of data with other devices that may be connected to the computing device 700. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, e.g., translation improvement program 114, can be stored on such portable computer-readable storage media and can be loaded onto persistent storage 708 of the computing device 700 via I/O interface(s) 712 of the computing device 700. Software and data used to practice embodiments of the present invention, e.g., translation improvement program 114, NMT models 116, NLU models 118, and other programs, can be stored on such portable computer-readable storage media and can be loaded onto persistent storage via I/O interface(s) 712. I/O interface(s) 712 also connect to a display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In certain alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for improving correction of machine mistranslation results, comprising:
   receiving, at one or more processors, a target document in a first language;
   translating, at one or more processors, the target document into a first translated document in a second language using a first neural machine translation (NMT) model;
   determining, at one or more processors, a target attribute value from the target document and a first translated attribute value for the first translated document using a natural language understanding (NLU) model;
   comparing, at one or more processors, the target attribute value to the first translated attribute value to determine a first comparison score for the first NMT model;
   in response to the first comparison score being less than a threshold, determining that the first translated document is a mistranslation of the target document, and creating a new NMT model by:
      compiling a bilingual corpus comprising i) a set of parallel translation documents selected based on parallel attribute values being within an attribute threshold from the target attribute value, and ii) a second set of parallel translation documents selected based on corresponding target attribute values in the second language being within a target attribute threshold from target attribute value, wherein the target attribute values are analogous to the parallel attribute values; and
      updating the first NMT model with the bilingual corpus; and
   outputting a new translation of the target document with the new NMT model.

2. The method of claim 1, further comprising:
   determining that the first comparison score is not above a threshold score;
   translating the target document into a second translated document in the second language using a second NMT model;
   determining a second translated attribute value for the second translated document; and
   comparing the target attribute value to the second translated attribute value to determine a second comparison score for the second NMT model.

3. The method of claim 2, further comprising:
   determining that the second comparison score is above the threshold score; and
   outputting the second translated document as a final translation for the target document.

4. The method of claim 2, further comprising repeating translating the target document using additional NMT models, determining additional translated attribute values, and determining additional comparison scores between the target attribute and one of the additional translated attribute values until one of the additional comparison scores is above the threshold score, wherein the target attribute value comprises a vector determined by a machine learning model.

5. The method of claim 1, further comprising:
   determining a corresponding attribute value in the second language that corresponds to the target attribute value; and
   compiling additional parallel translation documents into the bilingual corpus, wherein the additional parallel translation documents comprise additional parallel attribute values that are within an additional attribute threshold from the corresponding attribute value.

6. The method of claim 1, further comprising:
   determining that the first comparison score is above a threshold score; and
   implementing a term update confirmation process comprising:
      associating the target attribute value with a subject; and
      substituting a detected term in the first translated document with a substitute term related to the subject.

7. A computer program product for improving correction of machine mistranslation results, the computer program product comprising:
   one or more computer-readable storage media and program instructions collectively stored on the one or more computer-readable storage media, for causing a processor set to perform the following computer operations:
      receive a target document in a first language;
      translate the target document into a first translated document in a second language using a first neural machine translation (NMT) model;
      determine a target attribute value from the target document and a first translated attribute value for the first translated document using a natural language understanding (NLU) model;
      compare the target attribute value to the first translated attribute value to determine a first comparison score for the first NMT model;
      in response to the first comparison score being less than a threshold, determine that the first translated document is a mistranslation of the target document, and create a new NMT model using operations to:
         compile a bilingual corpus comprising i) a set of parallel translation documents selected based on parallel attribute values being within an attribute threshold from the target attribute value, and ii) a second set of parallel translation documents selected based on corresponding target attribute values in the second language being within a target attribute threshold from target attribute value, wherein the target attribute values are analogous to the parallel attribute values; and
      update the first NMT model with the bilingual corpus; and
   output a new translation of the target document with the new first NMT model.

8. The computer program product of claim 7, the program instructions further causing the processor set to:
   determine that the first comparison score is not above a threshold score;
   translate the target document into a second translated document in the second language using a second NMT model;
   determine a second translated attribute value for the second translated document; and
   compare the target attribute value to the second translated attribute value to determine a second comparison score for the second NMT model.

9. The computer program product of claim 8, the program instructions further causing the processor set to:
   determine that the second comparison score is above the threshold score; and
   output the second translated document as a final translation for the target document.

10. The computer program product of claim 8, the program instructions further causing the processor set to: repeat translating the target document using additional NMT models, determining additional translated attribute values, and determining additional comparison scores between the target attribute and one of the additional translated attribute values until one of the additional comparison scores is above the threshold score.

11. The computer program product of claim 7, the program instructions further causing the processor set to:
   determine a corresponding attribute value in the second language that corresponds to the target attribute value; and
   compile additional parallel translation documents into the bilingual corpus, wherein the additional parallel translation documents comprise additional parallel attribute values that are within an additional attribute threshold from the corresponding attribute value.

12. The computer program product of claim 7, the program instructions further causing the processor set to:
   determine that the first comparison score is above a threshold score; and
   implement a term update confirmation process comprising:
      associating the target attribute value with a subject; and
      substituting a detected term in the first translated document with a substitute term related to the subject.

13. A computer system for improving correction of machine mistranslation results, the computer system comprising:
   one or more computer processors, one or more computer-readable storage media, and program instructions stored on the computer-readable storage media for execution by at least one of the one or more computer processors, for causing a processor set to perform the following computer operations:

receive a target document in a first language;
translate the target document into a first translated document in a second language using a first neural machine translation (NMT) model;
determine a target attribute value from the target document and a first translated attribute value for the first translated document using a natural language understanding (NLU) model;
compare the target attribute value to the first translated attribute value to determine a first comparison score for the first NMT model;
in response to the first comparison score being less than a threshold, determine that the first translated document is a mistranslation of the target document, and create a new NMT model using operations to:
  compile a bilingual corpus comprising i) a set of parallel translation documents selected based on parallel attribute values being within an attribute threshold from the target attribute value, and ii) a second set of parallel translation documents selected based on corresponding target attribute values in the second language being within a target attribute threshold from target attribute value, wherein the target attribute values are analogous to the parallel attribute values; and
  update the first NMT model with the bilingual corpus; and
output a new translation of the target document with the new first NMT model.

14. The computer system of claim 13, the program instructions further causing the processor set to:
determine that the first comparison score is not above a threshold score;
translate the target document into a second translated document in the second language using a second NMT model;
determine a second translated attribute value for the second translated document; and
compare the target attribute value to the second translated attribute value to determine a second comparison score for the second NMT model.

15. The computer system of claim 14, the program instructions further causing the processor set to:
determine that the second comparison score is above the threshold score; and
output the second translated document as a final translation for the target document.

16. The computer system of claim 14, the program instructions further causing the processor set to: repeat translating the target document using additional NMT models, determine additional translated attribute values, and determine additional comparison scores between the target attribute and one of the additional translated attribute values until one of the additional comparison scores is above the threshold score.

17. The computer system of claim 13, the program instructions further causing the processor set to:
determine that the first comparison score is above a threshold score; and
implement a term update confirmation process comprising:
  associating the target attribute value with a subject; and
  substituting a detected term in the first translated document with a substitute term related to the subject.

* * * * *